United States Patent [19]
Appel et al.

[11] Patent Number: 5,498,869
[45] Date of Patent: Mar. 12, 1996

[54] APPARATUS FOR WOBBLE CORRECTION USING AN AGILE BEAM POLYGON ROS AND ALL-SPHERICAL OPTICS

[75] Inventors: James J. Appel, Brighton, N.Y.; Thomas L. Paoli, Los Altos, Calif.

[73] Assignee: Xerox Corporation, Stamford, Conn.

[21] Appl. No.: 457,606

[22] Filed: Jun. 1, 1995

Related U.S. Application Data

[63] Continuation of Ser. No. 169,696, Dec. 20, 1993, abandoned.

[51] Int. Cl.$^6$ ..................................................... H01J 3/14
[52] U.S. Cl. ......................................... 250/236; 359/216
[58] Field of Search .................................. 250/234, 235, 250/236; 358/451, 494; 359/216, 217, 218, 219

[56] References Cited

U.S. PATENT DOCUMENTS

| | | | |
|---|---|---|---|
| 4,203,672 | 5/1980 | Smith, Jr. | 356/431 |
| 4,386,272 | 5/1983 | Check, Jr. et al. | 250/236 |
| 4,733,064 | 3/1988 | Ishikawa | 250/201 |
| 4,950,888 | 8/1990 | Hamada | 250/236 |
| 4,992,655 | 2/1991 | Shelander | 250/235 |
| 5,103,091 | 4/1992 | Hirose et al. | 250/235 |
| 5,155,619 | 10/1992 | Fellows | 359/285 |
| 5,204,523 | 4/1993 | Appel et al. | 250/236 |
| 5,208,456 | 5/1993 | Appel et al. | 250/236 |
| 5,212,381 | 5/1993 | Appel et al. | 250/236 |
| 5,245,181 | 9/1993 | Cho | 250/236 |
| 5,264,869 | 11/1993 | Appel et al. | 346/108 |

OTHER PUBLICATIONS

*Handbook of Optics, vol. II, Devices, Measurements, and Properties*, Sponsored by the Optical Society of America, 1995, pp. 6.10–6.11.

F. Bestenreiner et al., "Visibility and Correction of Periodic Interference Structures in Line–by–Line Recorded Images", *Journal of Applied Photographic Engineering*, vol. 2, No. 2, Spring 1976, pp. 86–92.

*Handbook of Optics, vol. II, Devices, Measurements, and Properties*, Sponsored by the Optical Society of America, 1995, pp. 12.2 and 12.26–12.29.

ISOMET Application Note, "All about Bragg Angle Errors in Acousto–Optic Modulators & Deflectors, Isomet Corporation, Sprigfield, Virginia", Sep. 1977.

Leo Bademian, "Acousto–Optical Deflectors", Isomet Corporation, Springfield, Virginia, May 1993.

Filinski et al., "Fast Dispensive Beam Deflectors and Modulators" IEEE Journal of Quantum Electronics, vol. QE–18 No. 7, Jul. 1982.

*Primary Examiner*—Edward P. Westin
*Assistant Examiner*—Steven L. Nichols
*Attorney, Agent, or Firm*—Oliff & Berridge

[57] ABSTRACT

Facet-to-facet pyramidal wobble is corrected without resorting to cylindrical optics by adapting agile beam concepts to provide real-time control of the light beam position on the photoreceptor. The agile beam is provided by either or both of a variable wavelength light source or a variable index of refraction prism. The position of the light beam is determined by either or both of a super linear position detector directly detecting the position of the light beam, or a facet detector and a look-up table for indirectly estimating the position of the light beam. By actively compensating for pyramidal wobble, the passive but expensive and difficult-to-position cylindrical optics can be replaced with cheap and easy-to-position spherical optics.

13 Claims, 10 Drawing Sheets

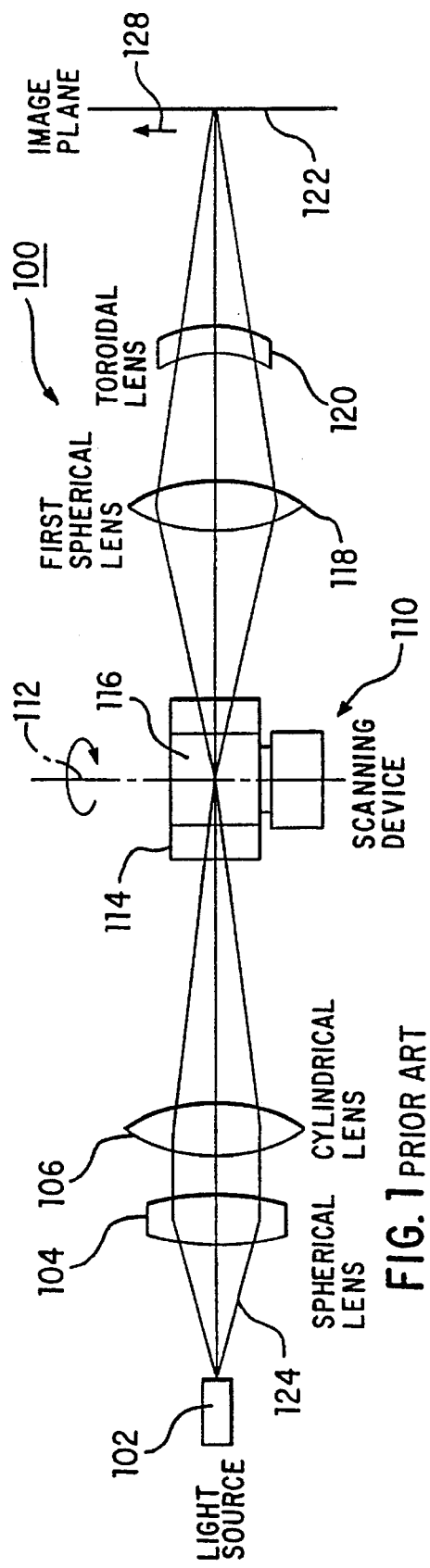
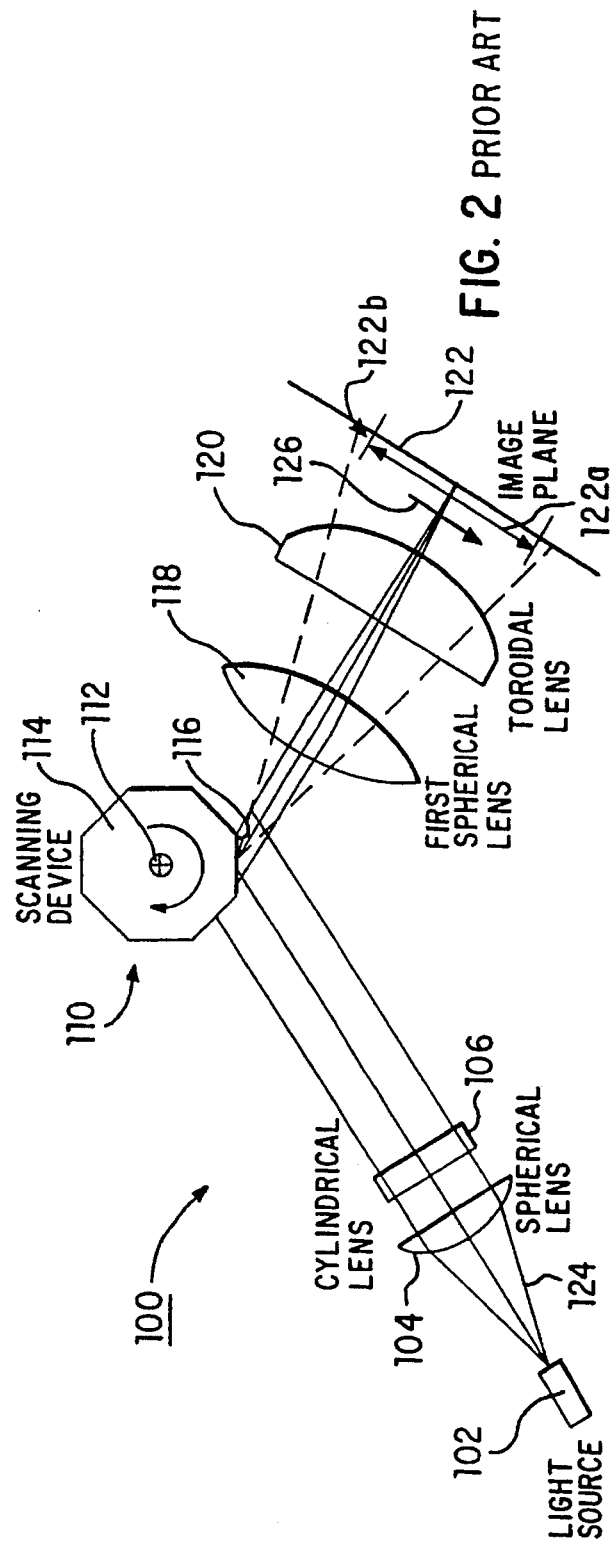

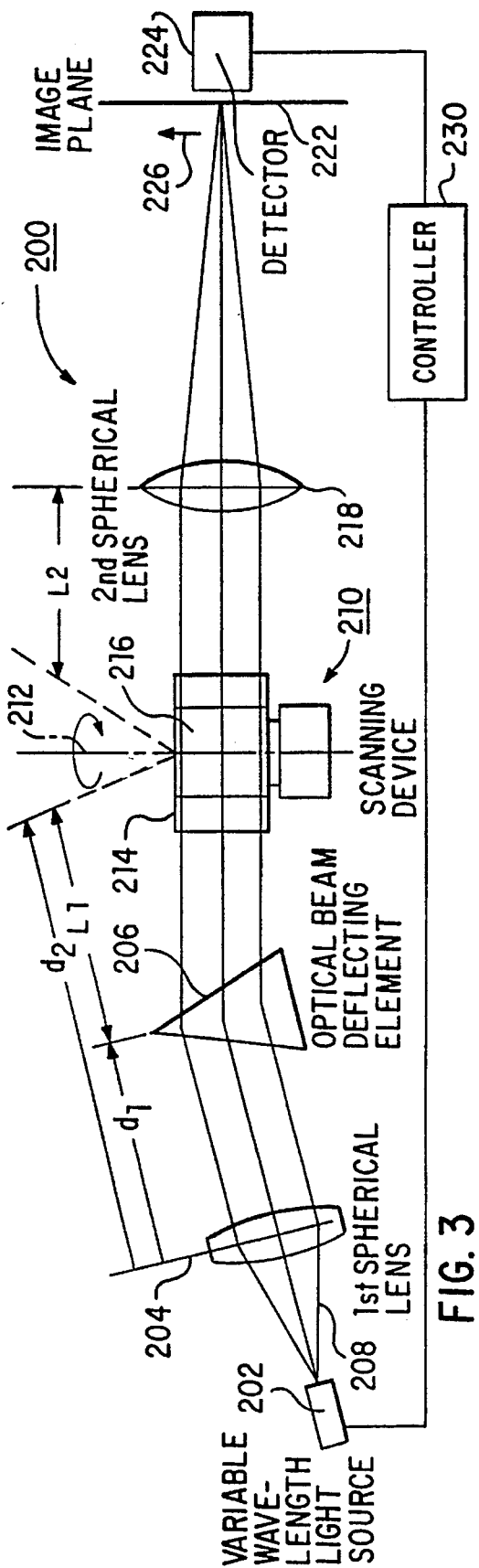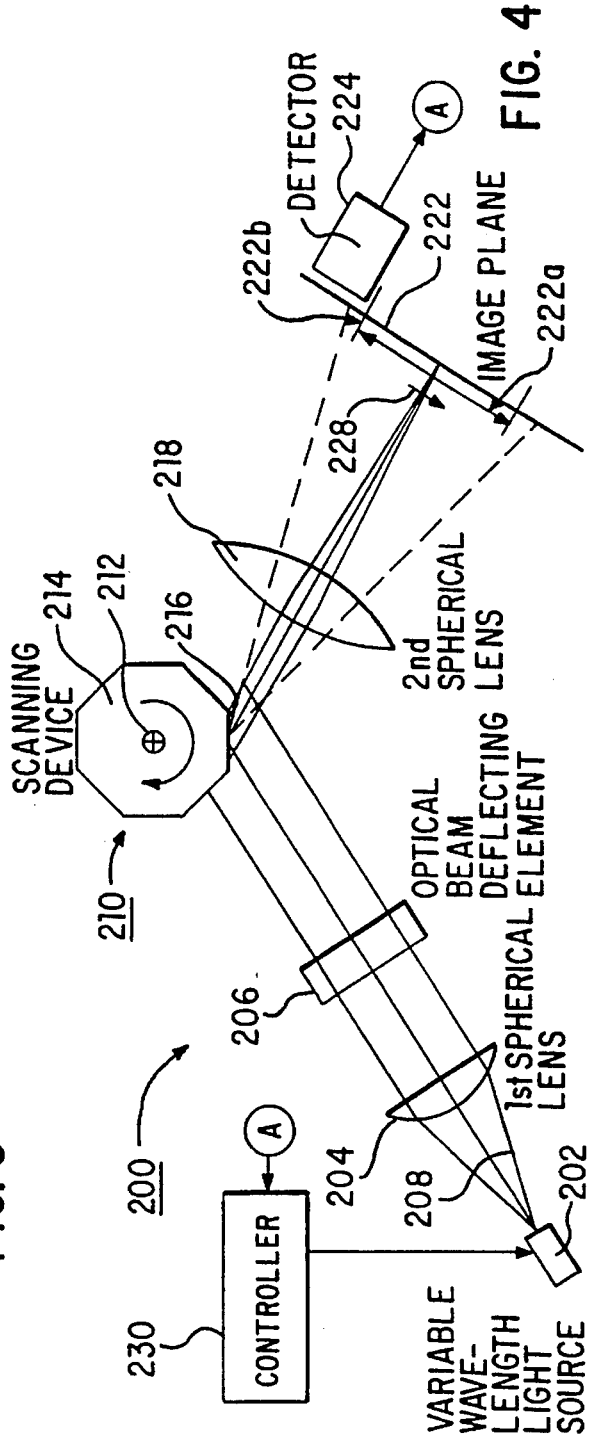
FIG. 3
FIG. 4

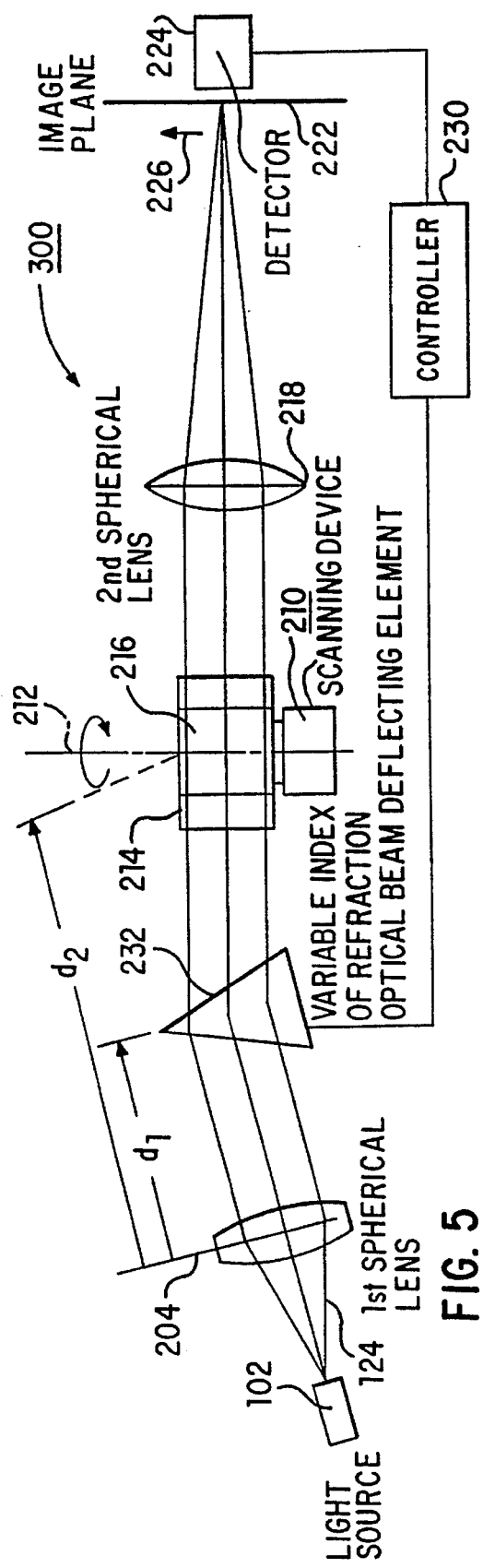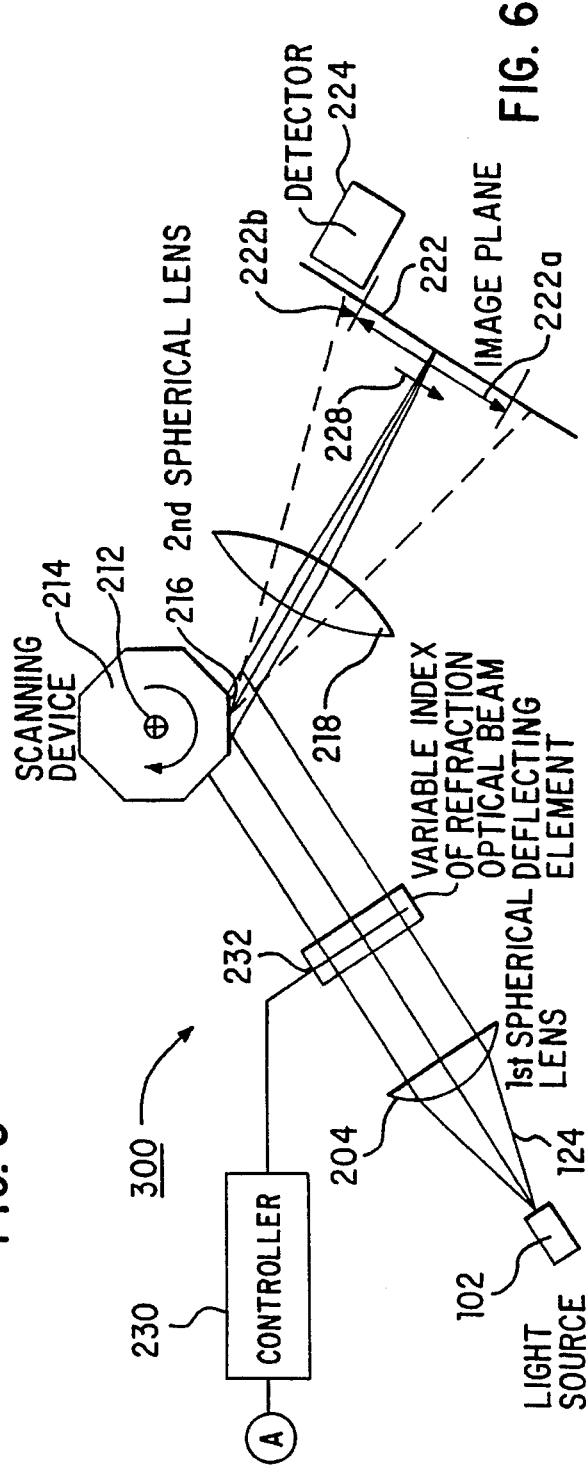
FIG. 5
FIG. 6

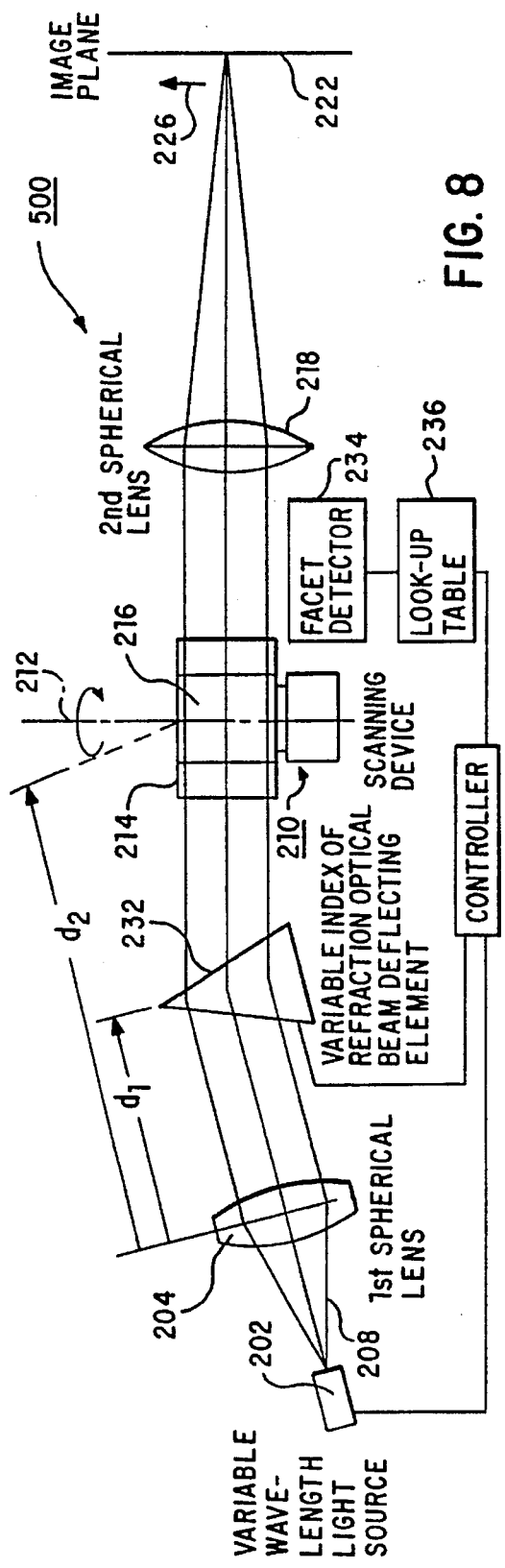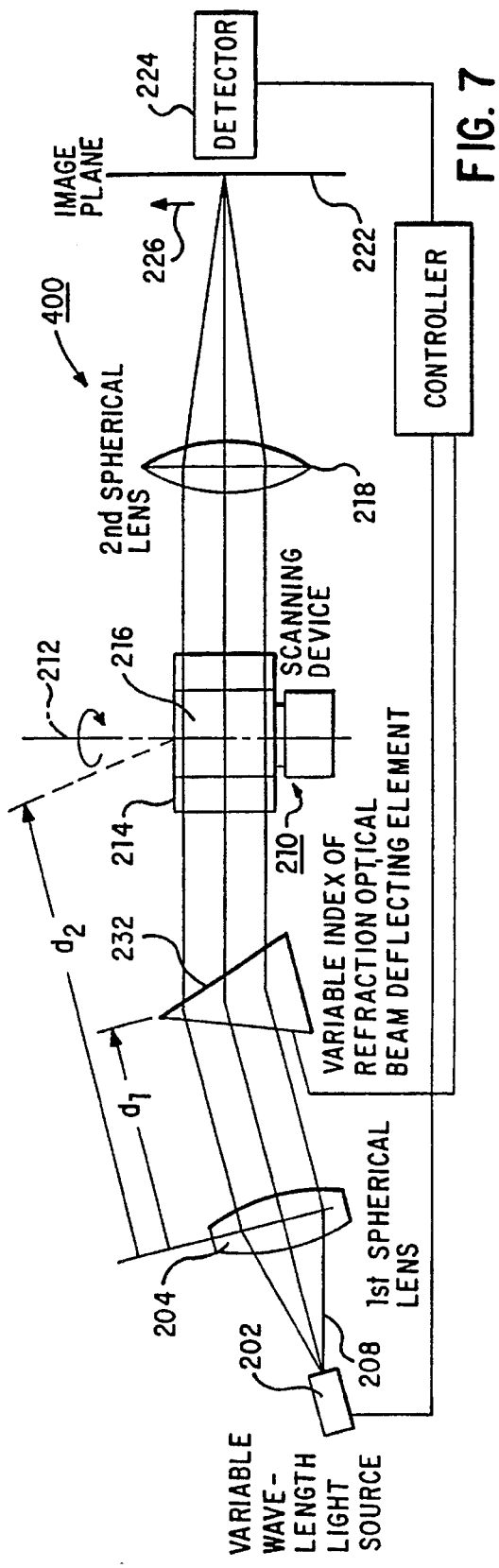

APPARATUS FOR WOBBLE CORRECTION USING AN AGILE BEAM POLYGON ROS AND ALL-SPHERICAL OPTICS

This is a continuation of application Ser. No. 08/169,696 filed Dec. 20, 1993, now abandoned.

BACKGROUND OF THE INVENTION

1. Field of the Invention

This invention relates generally to an image forming apparatus which uses rotating multifaceted reflective polygon scanners. In particular, this invention relates to a method for correcting facet-to-facet pyramidal wobble using agile beam concepts and all-spherical optics in place of conventional cylindrical optics.

2. Related Art

Facet-to-facet pyramidal wobble arises in any image forming apparatus which uses a rotating multifaceted reflective polygon scanner. While each facet of the polygon is ideally perfectly parallel to the axis of the rotation of the polygon, producing such a polygon scanner is generally impossible using standard manufacturing techniques. In general, each facet will be slightly skewed in the axial direction relative to the rotational axis of the polygon. Further, each facet will be skewed to a different degree. Without correcting for such facet-to-facet wobble, an image forming apparatus using a rotating multifaceted reflective polygon would form each scan line above or below the desired position. The amount of positive (above) or negative (below) displacement depends on the degree and sign (positive or negative) of the skew angle formed between the facet and the rotational axis of the polygon.

Conventionally, facet-to-facet pyramidal wobble has been corrected by using cylindrical optical elements in the pre-polygon and post-polygon optical systems. However, cylindrical optical elements are both expensive to manufacture and difficult and time consuming to accurately position within the image forming apparatus.

In contrast, spherical optical elements are both inexpensive to manufacture and relatively easy to install in the image forming apparatus. However, spherical optical elements are unable to inherently correct for wobble, as is the case with cylindrical optical elements. Accordingly, if all spherical optical elements are to be used, some additional mechanism which is capable of correcting facet-to-facet pyramidal wobble must be incorporated into the image forming apparatus.

U.S. Pat. Nos. 5,204,523, 5,208,456 and 5,212,381 to Appel and Paoli, who are also two of the inventors of this invention, describe "agile beam" concepts, and are incorporated herein by reference. As described in these patents, "agile beam" correction involves a tunable wavelength diode laser or other variable wavelength light sources or a variable index of refraction prism or similarly tunable electrical optical device. By using a variable wavelength light source or a variable index of refraction prism, slow scan direction process errors can be compensated for. These errors include ROS-ROS misregistration errors, photoreceptor motion errors or photoreceptor surface defects.

In the devices and methods described in these references, determination of slow scan direction positional errors in a previous scan line can be measured and used to alter either the variable wavelength of the light source or the variable index of refraction of the prism to compensate for the positional error of a current scan line. However, such post-formation correction is inapplicable to the problem of facet-to-facet pyramidal wobble, as the positional errors associated with each individual facet change from facet to facet. In contrast, the types of errors corrected in the previous agile beam devices are generally stable and repeatable. Thus, the previous agile beam devices and methods are insufficient to deal with facet-to-facet pyramidal wobble.

SUMMARY OF THE INVENTION

Accordingly, this invention incorporates agile beam concepts into an image forming apparatus using all spherical optics to compensate for facet-to-facet pyramidal wobble.

In particular, this invention provides for an image forming apparatus incorporating a variable wavelength light source, a position detector positioned adjacent a photoreceptor and a controller for altering the wavelength of the light beam emitted by the light source in response to the detected position of the light beam on the detector prior to scanning.

This invention further provides for an image forming apparatus using a variable index of refraction prism in place of the variable wavelength light source, the controller controlling the index of refraction of the prism to position the light beam in response to the detected position of the light beam.

This invention also provides for an image forming apparatus using both the variable wavelength light source and the variable index of refraction prism, the controller controlling both the index of refraction of the prism and the variable wavelength of the light source in order to provide for an apparatus which can compensate for a wider deviation from the desired position of the light beam and for an apparatus which can more finely position the scanning output beam.

This invention additionally provides for an image forming apparatus incorporating a look-up table. The look-up table stores correction values, each correction value corresponding to one of the facets of the polygon. A detector detects which of the polygon facets is currently active, and a controller controls one of the variable wavelength light source or the variable index of refraction prism to control the position of the light beam on the photoreceptor in response to the determined facet.

Finally, this invention provides for an image forming apparatus incorporating a look-up table and a detector for detecting the current active facet as well as the position detector positioned adjacent to a photoreceptor for detecting the actual displacement of the beam. In this way, the look-up table can provide for the gross correction of the positional error of the current polygon facet before the scan line begins, while the detector adjacent the photoreceptor can provide for subsequent fine adjustment based on a positional error remaining after the correction factor provided by the look-up table.

These and other features and advantages of this invention will become apparent from the following Description of the preferred embodiments.

BRIEF DESCRIPTION OF THE DRAWINGS

The preferred embodiments of this invention will be described with respect to the following drawings, in which like reference numerals identify like elements and wherein:

FIG. 1 shows a side or elevation view of the general optical configuration of the conventional polygon ROS image forming device;

FIG. 2 shows a top or plan view of the general configuration of the apparatus shown in FIG. 1;

FIG. 3 shows a side or elevation view of the general optical configuration of the image forming apparatus function in accordance with the first embodiment of the present invention showing the variable wavelength light source;

FIG. 4 shows a top or plan view of the general optical configuration of the apparatus of FIG. 3;

FIG. 5 shows a side or elevation view of the general configuration of a second embodiment of the invention, showing the variable index of refraction prism positioned between the spherical pre-polygon collimating lens and the scanning polygon;

FIG. 6 shows a top or plan view of the general optical configuration of the apparatus of FIG. 5;

FIG. 7 shows a side or elevational view of the general optical configuration of the third embodiment of the present invention, showing both the variable wavelength light source and the variable index of refraction prism;

FIG. 8 shows a side or elevation view of a general optical configuration of a fourth embodiment of the invention, showing the lookup table;

DETAILED DESCRIPTION OF THE PREFERRED EMBODIMENTS

Figure 9:
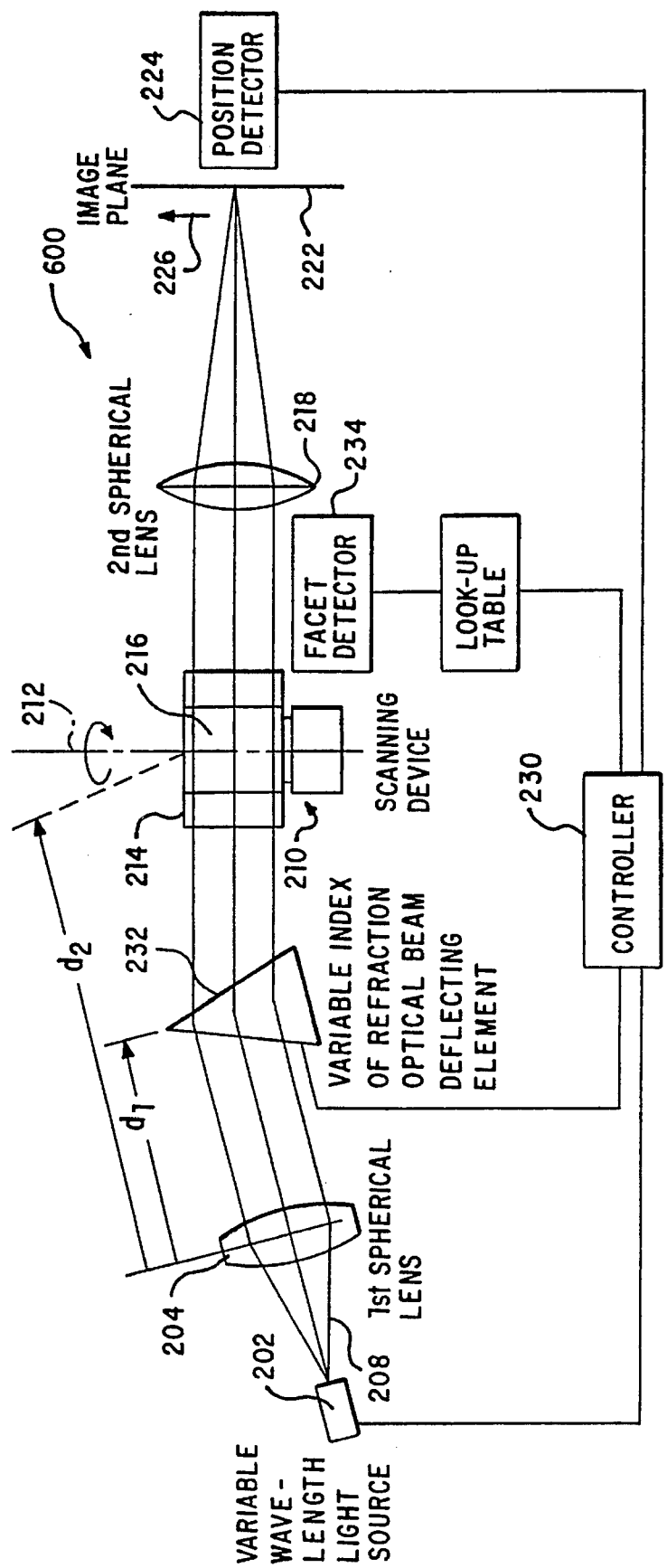
FIG. 9 shows the fifth embodiment of the present invention, incorporating the variable wavelength light source, the variable index of a fraction prism, and the look-up table.

As shown in FIG. 1, the conventional polygon scanning raster output scanner (polygon ROS) comprises a light source 102 emitting a light beam 124. The light beam passes first through a spherical collimating lens 104 and then through a cylindrical lens 106. The pair of lenses 104 and 106 act to collimate the light beam 124 in the fast scan direction and to converge the light in the cross scan direction to a line focus on the polygon facet of the rotating polygon 114.

As shown in FIG. 1, the scanning device 110 causes the rotating polygon 114 to rotate clockwise around the axis of rotation 112.

The active facet 116 of the polygon 114 reflects the light beam 124 to the spherical lens 118. The beam 124 passes through the spherical lens 118 and a toroidal lens 120. The combination of these two elements assures that the beam 124, as it is scanned in the scan direction 126 (as shown in FIG. 2), scans across the image area 122a in the scan direction 126 at a substantially constant speed. These post polygon lenses are also designed to flatten the field. As shown in FIG. 1, as the current facet 116 scans the beam in the scan direction 126, the image plane is moving in a process direction 128 which is perpendicular to the scan direction 126.

As shown in FIGS. 3 and 4, a first embodiment of this invention uses substantially the same configuration as the conventional apparatus 100 shown in FIGS. 1 and 2. However, the fixed wavelength light source 102 of the conventional apparatus 100 has been replaced by a variable wavelength light source 202 in the first embodiment of the present apparatus 200. In addition, the variable wavelength light beam 208, after passing through a first spherical lens 204, remains collimated in both the fast scan and the slow scan directions, and is directed onto the optical beam deflecting element 206. Thus, the expensive and difficult-to-align cylindrical lens 106 of the conventional apparatus can be eliminated.

After passing through the optical beam deflecting element 206, the collimated light beam 208 is directed on to the active facet 216 of the rotating multi-facet polygon 214. After being reflected off of the active facet 216, the variable wavelength light beam 208 passes through the second spherical lens 218 and is focused onto the image plane 222.

As shown in FIG. 3, the detector 224 detects the actual position, in the process direction 226 of the image plane, onto which the variable wavelength light beam 208 is focused. As shown in FIG. 4, the detector 224 is positioned at an extreme left hand position of the image plane 222 in the scan direction 228. Because the polygon 214 rotates about the axis of rotation 212 in a clockwise direction, the detector 224 is thus located at a position before the scanning beam 208 reaches the actual image forming region 222a. The signal output by the detector 224 is input into a controller 230, which determines the wavelength the light source must be changed to, in order to move the variable wavelength light beam 208 from its current position to the desired position. Typically, the variable wavelength light source will output a coherent light beam in the range of 770 nm to 790 nm. However, those skilled in the art will be able to select other appropriate wavelength ranges for the variable wavelength light source based on the requirements of their particular system, primarily the requirements of the photoreceptor or other photo-active elements. Thus, the wobble correction is obtained by open loop, real-time control for each scan.

The detector 224 is a United Detector Technologies super linear position detector that is placed outside the imaging area 222a before the fast scan leading edge 222b. In this way, measurement and appropriate correction of the position of the light beam 208 in the process direction 226 is made before any imaging of each scan line begins. The super linear position detector 224 has dimensions of 1 mm by 1 mm and requires a dwell time of 100 nanoseconds to ensure the position measurement is valid. Thus, the beam 208 cannot travel more than 1 mm in the scan direction 228 in the 100 nanosecond dwell time window. Otherwise, a valid measurement could not be obtained.

This upper limit on the velocity of the beam corresponds to a maximum scan frequency of 23,000 scan lines per second, assuming a scan length of approximately 14 inches with the actual image area 222a comprising 85 percent of the scan length (i.e., a scan efficiency of 85 percent). At the current operating resolution of polygon ROSs (600 scan lines per inch in the process direction 226), the maximum 23,000 scan lines per second can be obtained so long as the maximum process direction speed is approximately 38 inches per second or less.

The signal from the super linear position detector 224 is in the form of a voltage pulse, with the peak voltage of the pulse proportional to the error from the desired position. That is, the detector outputs a zero voltage pulse when the variable wavelength light beam 208 is positioned directly on the desired position. However, should the variable wavelength light beam 208 deviate above the desired position, the super linear position detector outputs a positive voltage. Should the variable wavelength light beam 208 deviate below the desired position, the super linear position detector outputs a negative voltage.

The voltage pulse signal output from the super linear position detector 224 is sampled and held by the controller 230. The sampled/held peak voltage value and its polarity are then processed in the controller 230 to generate a drive signal to drive the variable wavelength light source 202. Depending on whether the detected position is above or below the desired position, the drive signal drives the variable wavelength light source 202 to lengthen or shorten the wavelength of the light beam 208, respectively. This moves the incident position of the light beam 208 on the image plane 222 negatively or positively, respectively. For the variable wavelength light source 202, the signal generated by the controller 230 is a relative low voltage and a relatively high current.

In addition, to ensure real-time response, the time between the beam position measurement and the application of the drive signal to the variable wavelength light source must be less than the beam travel time from the position detector 224 to the leading edge 222b of the imaging area 222a. Even if up to two microseconds (a relatively long time) is required to process and generate the drive signal after the beam position measurement is taken and to apply the generated drive signal to the variable wavelength light source, and even assuming the maximum scan frequency of 23,000 scans per second, the position detector 224 would need to be mounted no more than 20 mm from the leading edge 222b of the imaging area 222a.

As shown in FIGS. 5 and 6, in the second preferred embodiment, the variable wavelength light source 202 is replaced by the standard light source 102 of the conventional apparatus. However, the optical beam deflecting element 206 in the first preferred embodiment is replaced with a variable index of refraction prism 232 in the second preferred embodiment. The only additional difference between the first preferred embodiment shown in FIGS. 3 and 4 and the second preferred embodiment shown in FIGS. 5 and 6 is that the output of the controller is applied to the variable index of refraction prism 232 rather than the variable wavelength light source 202. In addition, for the variable index of refraction prism, the signal generated by the controller 230 is a relatively high voltage and a relatively low current.

In a third preferred embodiment shown in FIG. 7, the variable wavelength light source 202 and the variable index of refraction prism 232 can be incorporated into the same apparatus 300. In this way, both the wavelength of the light beam 208 and the degree of refraction of the prism 232 can be controlled simultaneously. This allows both a greater range of deviation of the light beam 208 from the desired position to be compensated for and a finer correction to be obtained.

In the fourth preferred embodiment shown in FIG. 8, the super linear position detector 224 is replaced with a facet detector 234 and a look-up table 236. In general, the facet-to-facet wobble of the scanning device 210 is not perfectly repeatable from one rotation of the polygon 214 to the next. That is, while the error caused by wobble of the scanning polygon 214 is generally fixed and can be predicted, the exact degree of wobble does not simply depend upon the fixed manufacturing and alignment errors in the scanning device 210. In addition, thermal effects such as heating and cooling of the polygon 214 and other elements of the optical system, and other environmental effects such as vibration, humidity, etc. will effect the exact positioning of the beam 208 on the image plane 222.

Nonetheless, a significant portion of the error arises from manufacturing defects in forming the polygon 214 and in other fixed position error sources. The look-up table 236 has a number of entries equal to the number of facets on the polygon 214 and is presupplied with the fixed errors in facets 216 of the polygon 214. Thus, if the polygon facet detector 234 generates a signal indicating which of the facets is the active facet 216 and outputs a signal to the look-up table 236, the look-up table 236 is able to output a correction factor. Then, whether the apparatus 400 employs either the variable wavelength light source embodiment of FIGS. 3 and 4 or the variable index of refraction embodiment shown in FIGS. 5 and 6, the controller 230 can convert the error signal from the look-up table 236 to drive signals for driving the variable wavelength light source 208 or the variable index of refraction prism 232.

Additionally, both the position detector 224 and the facet detector 234 can be combined in a single embodiment, as shown in FIG. 9. In this fifth embodiment, the generalized errors known to be associated with the current active facet 216 can be compensated for immediately after the light beam, as it is scanned by the previous active facet, moves out of the image plane 222a. This can be accomplished by providing appropriate timing for and positioning of the facet detector 234. In this way, a significant portion of the error is already compensated for by the time the beam 208 from the current facet 216 is directed onto the detector 224. Thus, the position detector 224 can be used to provide the scan-to-scan variable error fine tuning. Finally, in either the apparatus 600 of the fifth embodiment, or the apparatus 500 of the fourth embodiment, the combined variable wavelength light source and variable index of refraction prism embodiment can be used.

Figure 10:
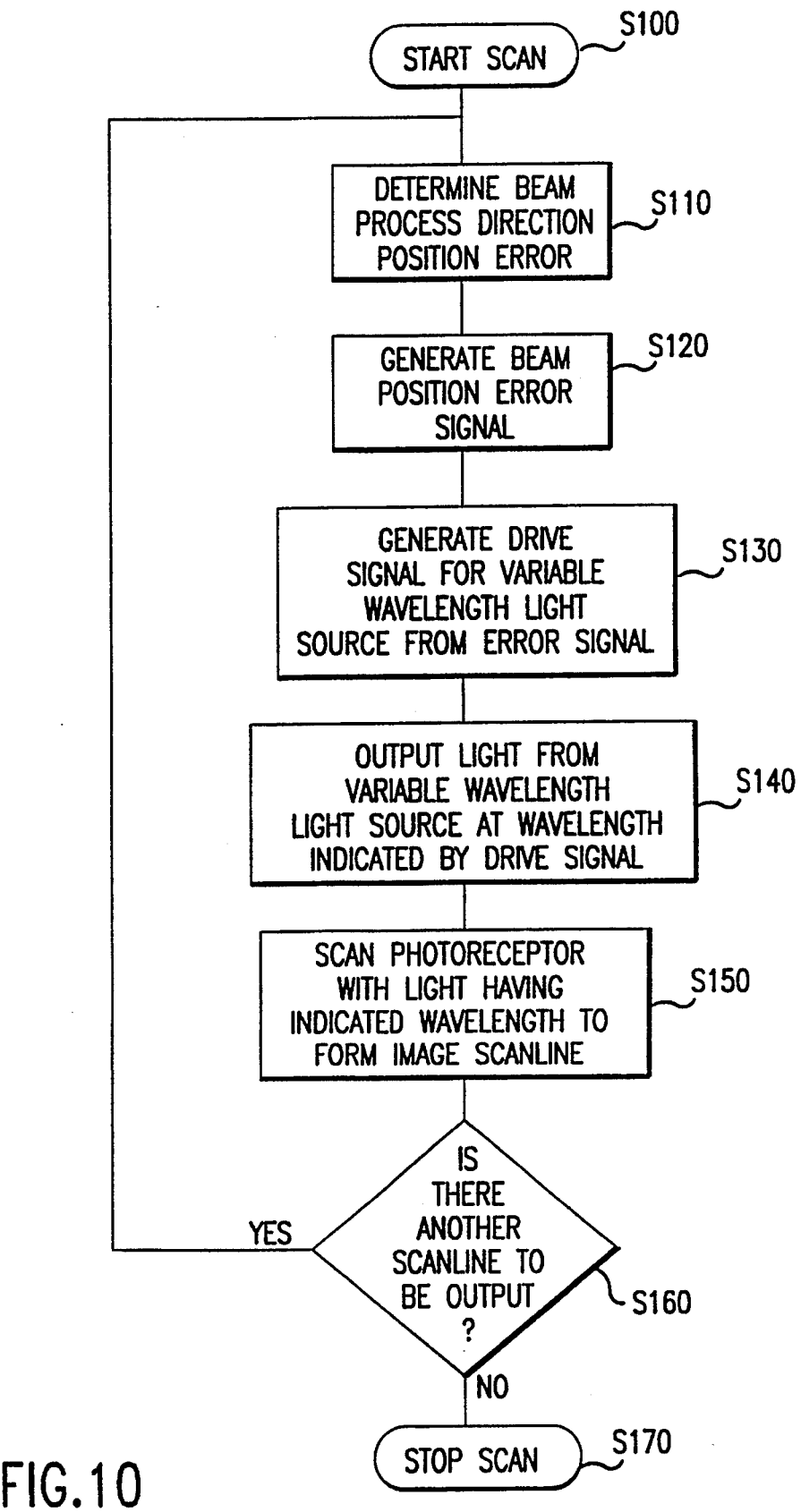
FIG. 10 shows a generalized flow chart for the first embodiment.

As shown in FIG. 10, the generalized flow chart for the first embodiment comprises starting the scanning process in step S100, then determining, in step S110, the beam position error. Then, in step S120, the detector 224 generates the position error value and the position error direction and outputs it to the controller 230. In step S130, the controller 230 inputs the position error and direction signals from the detector 224 and generates the drive signal for the variable wavelength light source 202. In step S140, the wavelength of the variable wavelength light source 108 is altered to correct for the beam position error. Then, in step S150, a scan line is formed by scanning and modulating the light beam 208. Finally, in step S160, the system determines whether a next scan line needs to be formed. If so, control returns to step S110. Otherwise, control continues to step S170 and stops.

Figure 11:
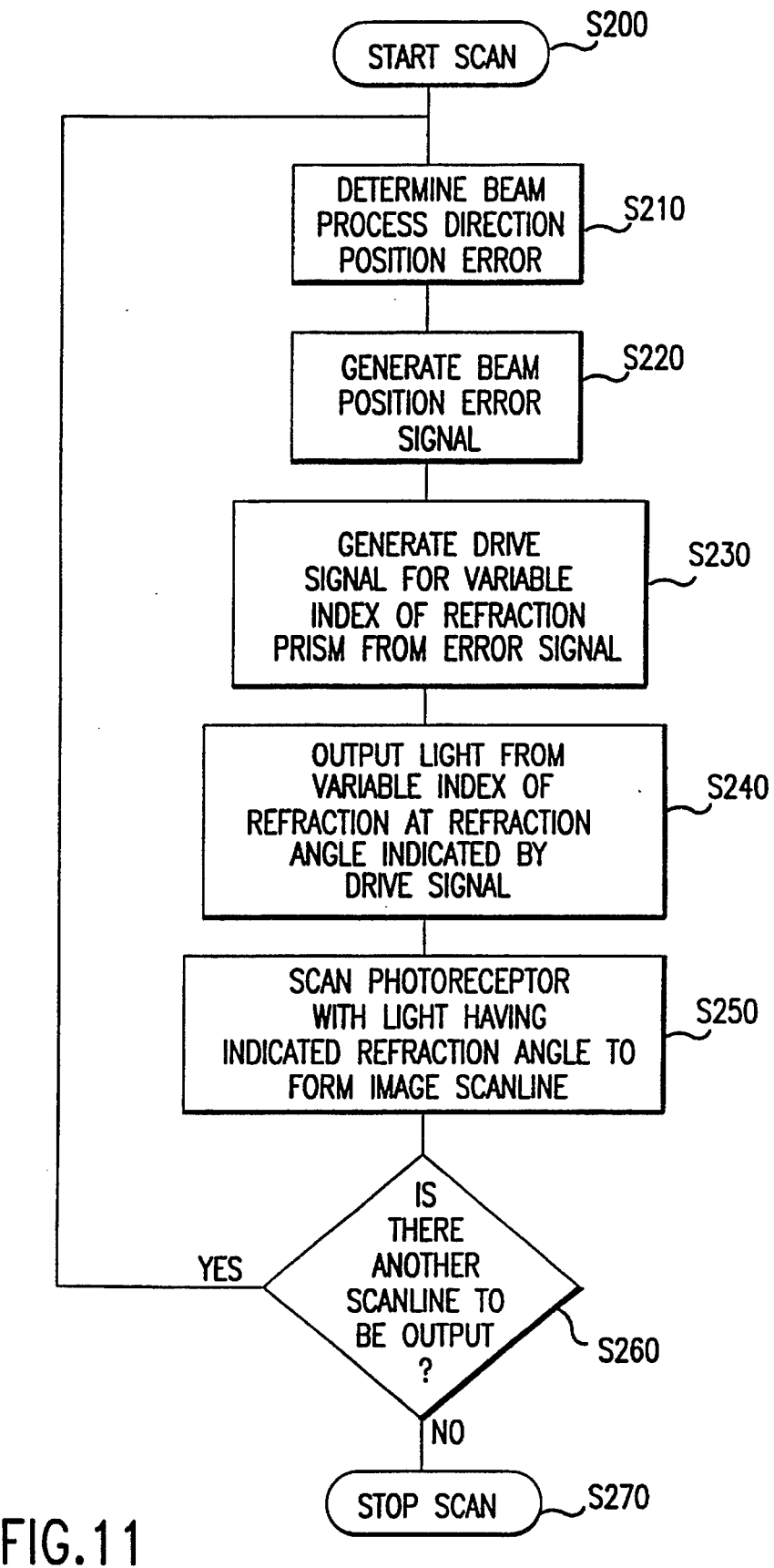
FIG. 11 shows a generalized flow chart for the second embodiment.

As shown in FIG. 11, the flow chart for the second embodiment is essentially identical to the flow chart for the first embodiment. However, step S140, which alters the variable wavelength of the light beam 208 emitted by light source 202 is replaced by step S240, which varies the index of refraction of the variable index of refraction prism 232.

Figure 12:
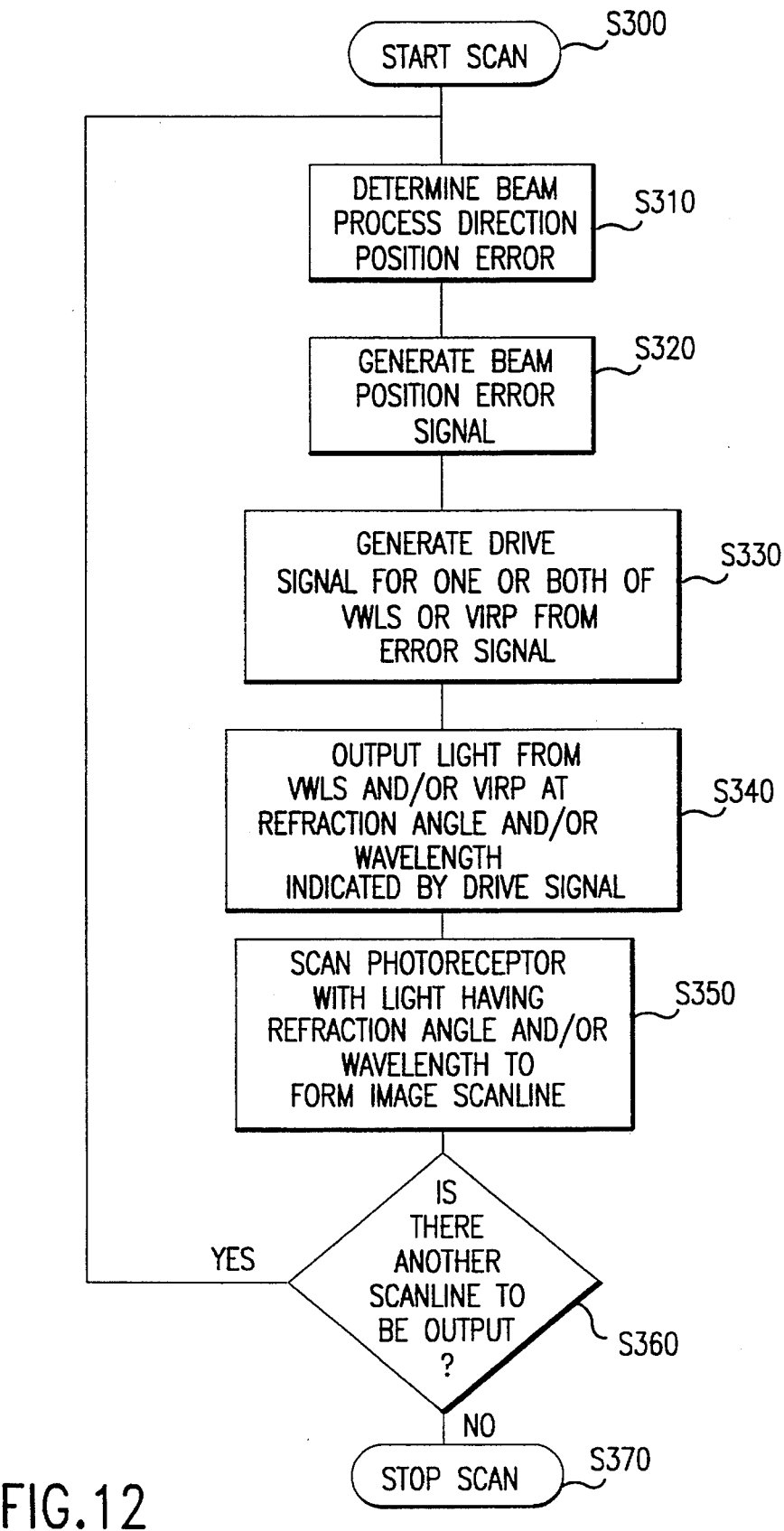
FIG. 12 shows a generalized flow chart for the third embodiment.

In the third embodiment of the method of the invention, as shown in the flow chart of FIG. 12, the flow charts of FIGS. 10 and 11 are combined, so that the controller 230 outputs drive signals to both the variable wavelength light source 202 and the variable index refraction prism 232. In this way, a wider range of position errors can be compensated for.

Figure 13:
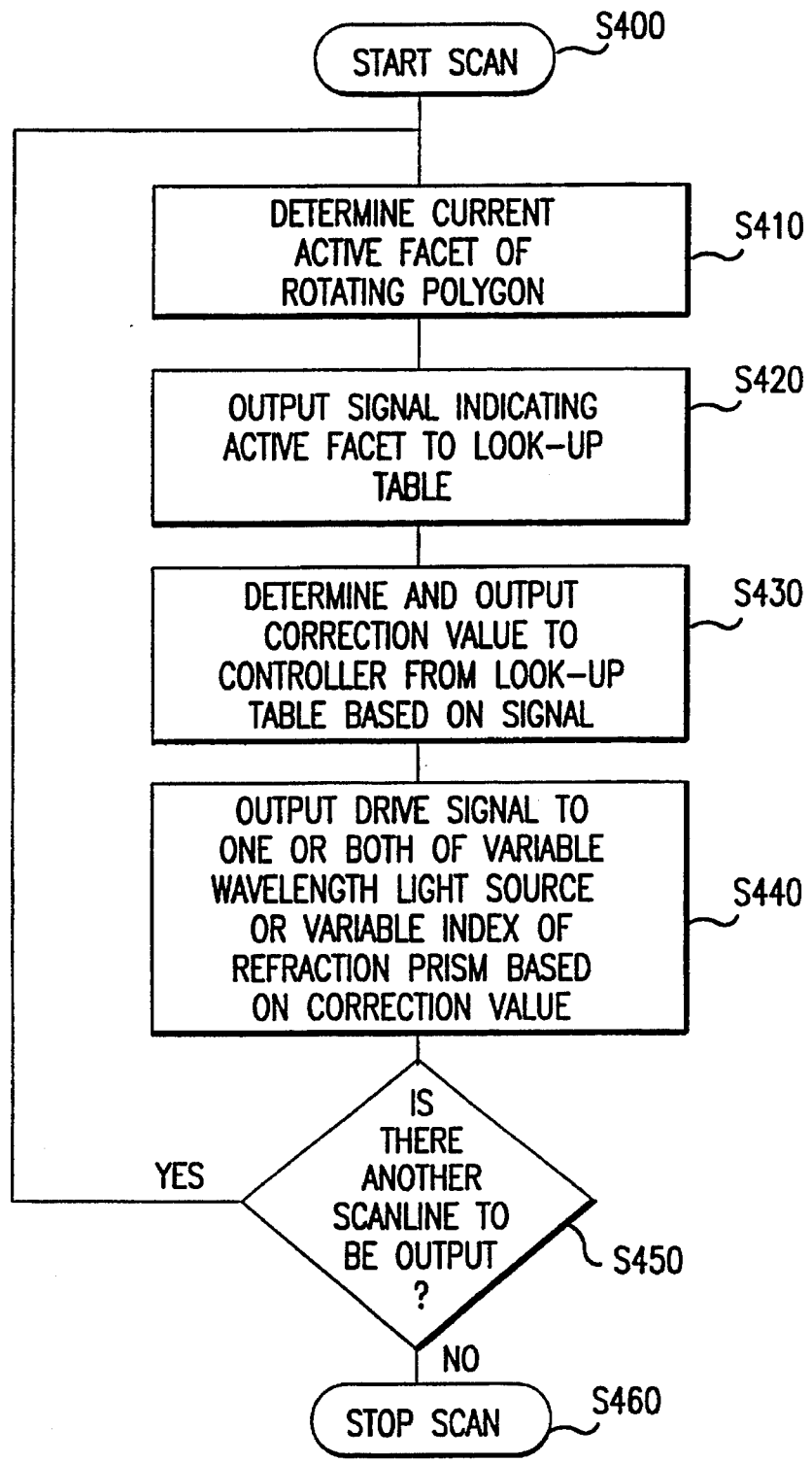
FIG. 13 shows a generalized flow chart for the fourth embodiment.

FIG. 13 shows the flow chart for the operation of the fourth preferred embodiment of the invention as shown in FIG. 8. After starting in step S400, the current facet is determined in step S410. In step S420, the facet detector 234 outputs a signal to the look-up table 236. In step S430, the look-up table outputs a drive signal to the controller 230. In step S440, the controller 230 converts and applies the drive signal generated from the error signal output by the look-up table 236 to one of the variable wavelength light source 202 or the variable index of refraction prism 232. Then, in step S450, the system determines whether the last scan line has been output. If so, the control continues to step S460, where the process ends. Otherwise, control continues back to step S410 for the next facet and scan line.

Finally, the embodiments of the method shown in FIG. 13 and any one of FIGS. 10, 11 or 12 can be combined. In this way, a first portion of the position error, which is associated with the fixed position errors and manufacturing errors of the scanner, is corrected by detecting, in a first step, the current active facet 116. In a second step, the look-up table 236 inputs the output from the facet detector 234 and outputs a drive signal to the controller 230. Then in a third step, applying a drive signal from the controller 230 to either one or both of the variable wavelength light source 202 and the variable index of refraction prism 232, prior to the light beam 208 being focused onto the detector 224. In this way, a significant part of the position error is compensated for prior to the beginning of the scan line. Then, in a fourth step, the light beam 208 is focused onto the detector 224. In a fifth step, the position value and direction signals are generated and are output to the controller 230. The controller 230 then fine tunes, in a sixth step, one, the other, or both of the variable wavelength light source 202 and the variable index of refraction prism 232 to fully correct for the position error.

Figure 14:
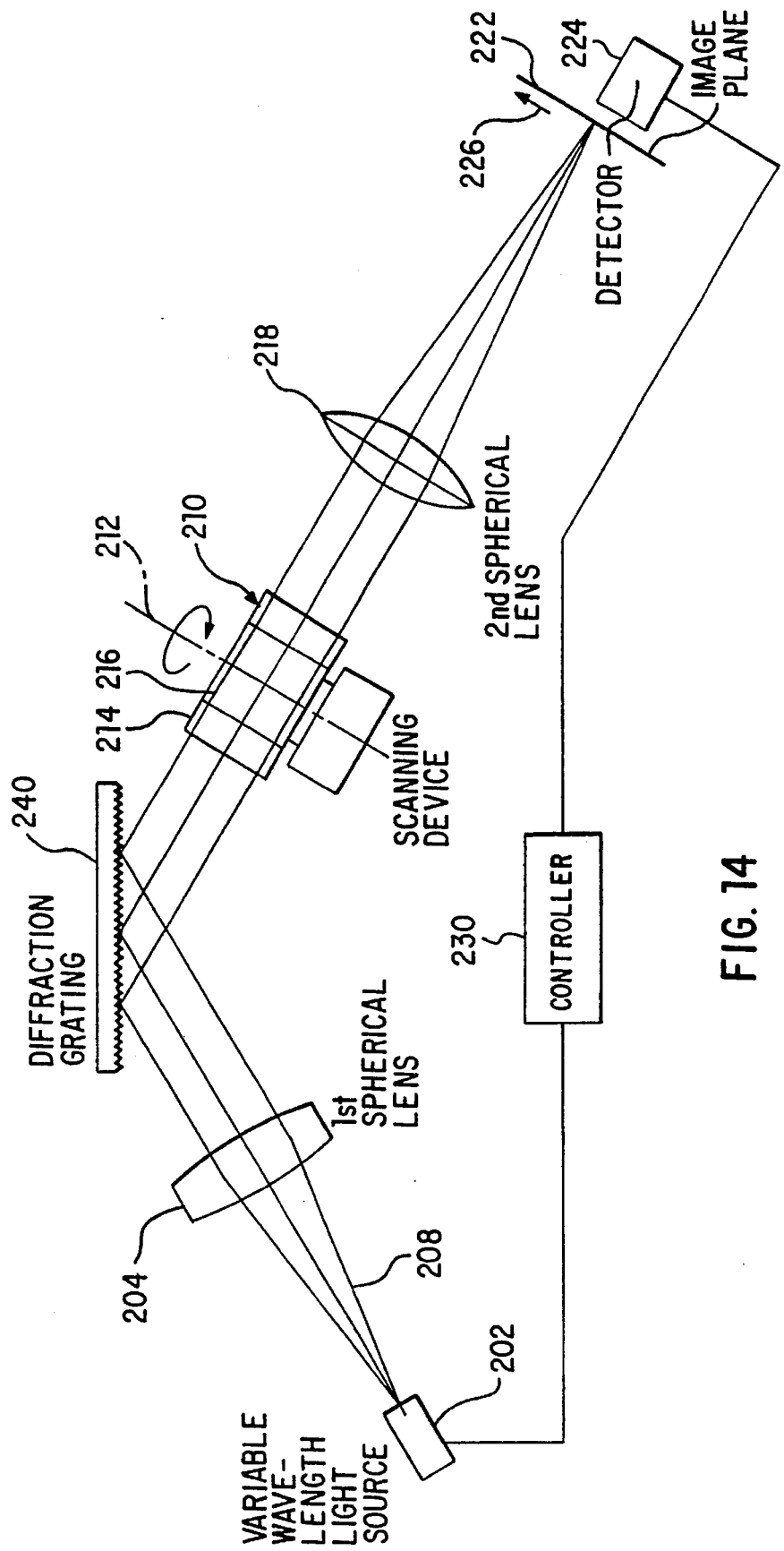
FIG. 14 shows an alternate form of the first embodiment, using a diffraction grating.

Finally, in those embodiments which do not make use of the variable index of refraction prism 232, the standard prism 206 can be replaced with a diffraction grating 240, as shown in FIG. 14. In all other respects, the apparatus and operation of the variable wavelength light source embodiments shown in FIGS. 3 and 4 would not change.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. A polygon ROS image forming apparatus, comprising:

light source means for emitting a light beam;

pre-polygon lens means for collimating the emitted light beam, the pre-polygon lens means being composed solely of spherical optics;

a semiconductor variable index of refraction prism for refracting the collimated light beam;

a multifaceted, reflective polygon having a plurality of reflective facets and reflecting the refracted light beam;

post-polygon lens means for focusing the reflected light beam onto an image area of a photoreceptor, the post-polygon lens means being composed solely of spherical optics;

sensor means for detecting a position of the focused light beam on the photoreceptor, the sensor means positioned before a leading edge of the image area; and control means for controlling at least one of the variable index of refraction prism and the light source means in response to the detected position to move the focused light on the photoreceptor to a desired position.

2. The image forming apparatus of claim 1, wherein the light source means is a variable wavelength light source, the controller control means a wavelength of the light beam emitted by the variable wavelength light source to move the light beam to the desired position.

3. The image forming apparatus of claim 2, wherein the control means simultaneously controls both the variable wavelength light source and the semiconductor variable index of refraction prism to move the light beam to the desired position.

4. The image forming apparatus of claim 1, wherein the control means varies the index of refraction of the semiconductor variable index of refraction prism to move the light beam to the desire position.

5. A polygon ROS image forming apparatus, comprising:

light source means for emitting a light beam;

pre-polygon lens means for collimating the emitted light beam, the pre-polygon lens means being composed solely of spherical optics;

semiconductor prism means having a variable index of refraction for refracting the collimated light beam;

a multifaceted, reflecting polygon scanning means for reflecting the refracted light beam;

post-polygon lens means for focusing the reflected light beam onto an image area of a photoreceptor, the post-polygon lens means being composed solely of spherical optics;

sensor means for detecting a position of the focused light beam, the sensor means positioned before a leading edge of the image area; and control means for varying the variable index of refraction of the semiconductor prism means in response to the detected position of the focused light beam to reposition the light beam in the process direction prior to scanning the light beam across the image area.

6. The image forming apparatus of claim 5, wherein the sensor means detects a position of the focused light beam in a process direction of the photoreceptor.

7. A polygon ROS image forming apparatus, comprising:

variable wavelength light source means for emitting a light beam and for varying a wavelength of the emitted light beam;

pre-polygon lens means for collimating the emitted light beam, the pre-polygon lens means being composed solely of spherical optics;

refracting means for refracting the collimated light beam;

a multifaceted reflecting polygon scanner means for reflecting the refracted light beam;

post-polygon lens means for focusing the reflected light beam onto an image area of a photoreceptor, the post-polygon lens means being composed solely of spherical optics;

sensor means for detecting a position of the focused light beam, the position detector means positioned before a leading edge of the image area; and control means for varying the wavelength of the light beam emitted by the variable wavelength light source means in response to the detected position of the focused light beam to move the focused light beam to a desired position.

8. The image forming apparatus of claim 7, wherein the sensor means detects the position of the focused light beam in a process direction of the photoreceptor.

9. The image forming apparatus of claim 7, wherein the variable wavelength light source means varies the wavelength of the emitted light beam over a range of 770 nm to 790 nm.

10. The image forming apparatus of claim 7, wherein the refracting means is a prism.

11. A wobble correcting system for a ROS image forming apparatus, the image forming apparatus comprising a light source emitting a light beam, a multifaceted, reflecting, and rotating polygon, and a photoreceptor, the wobble correction system comprising:

a pre-polygon collimating lens device being composed solely of spherical optics;

a semiconductor variable index of refraction prism having a variable index of refraction;

a post-polygon lens device being composed solely of spherical optics;

sensor means for determining a position of the light beam in a process direction of the photoreceptor; and control means for varying the variable index of refraction in response to the detected position of the light beam to move the light beam to a desired position;

wherein the pre-polygon collimating lens device is positioned between the light source and the polygon, the semiconductor variable index of refraction prism is positioned between the pre-polygon collimating lens device and the polygon, the post-polygon lens device is positioned between the polygon and the photoreceptor, and the sensor means is positioned adjacent the photoreceptor.

12. A wobble correcting system for a ROS image forming apparatus, the image forming apparatus comprising a variable wavelength light source emitting a light beam, a multifaceted reflecting and rotating polygon, and a photoreceptor, the wobble correction system comprising:

a pre-polygon collimating lens device being composed solely of spherical optics;

a refracting means for refracting the collimated light beam onto the polygon;

a post-polygon lens device being composed solely of spherical optics;

sensor means for determining a position of the light beam in a process direction of the photoreceptor; and control means for varying the variable wavelength light source in response to the detected position of the light beam to move light beam to a desired position;

wherein the pre-polygon collimating lens device is positioned between the light source and the polygon, the refracting means is positioned between the pre-polygon collimating lens device and the polygon, the post-polygon lens device is positioned between the polygon and the photoreceptor, and the sensor means is positioned adjacent the photoreceptor.

13. The wobble correcting system of claim 12, wherein the refracting means is a variable index of refraction prism, the controller simultaneously controlling the variable index of refraction and the variable wavelength to move the light beam to the desired position.

* * * * *